(12) United States Patent
Akella (10) Patent No.: US 8,812,985 B2
(45) Date of Patent: Aug. 19, 2014

(54) METHOD AND DEVICE FOR ENHANCING SCROLLING OPERATIONS IN A DISPLAY DEVICE

(75) Inventor: Venkata Sastry Akella, Sunnyvale, CA (US)

(73) Assignee: Motorola Mobility LLC, Libertyville, IL (US)

( * ) Notice: Subject to any disclaimer, the term of this patent is extended or adjusted under 35 U.S.C. 154(b) by 264 days.

(21) Appl. No.: 12/609,420

(22) Filed: Oct. 30, 2009

(65) Prior Publication Data

US 2011/0107264 A1    May 5, 2011

(51) Int. Cl.
*G06F 3/048* (2013.01)

(52) U.S. Cl.
USPC ........... 715/830; 715/784; 715/201; 345/684; 345/676; 345/647

(58) Field of Classification Search
USPC .......... 715/830, 784, 786, 769, 201; 345/685, 345/684, 676
See application file for complete search history.

(56) References Cited

U.S. PATENT DOCUMENTS

| | | | | |
|---|---|---|---|---|
| 4,491,933 A | * | 1/1985 | Ursin et al. | 715/201 |
| 5,317,306 A | * | 5/1994 | Abraham et al. | 345/684 |
| 5,528,259 A | * | 6/1996 | Bates et al. | 345/676 |
| 5,548,702 A | * | 8/1996 | Li et al. | 715/769 |
| 5,553,223 A | * | 9/1996 | Greenlee et al. | 715/866 |
| 5,621,906 A | * | 4/1997 | O'Neill et al. | 715/848 |
| 5,677,708 A | * | 10/1997 | Matthews et al. | 348/E5.104 |
| 5,740,389 A | * | 4/1998 | Li et al. | 715/769 |
| 5,872,566 A | * | 2/1999 | Bates et al. | 715/786 |
| 5,877,760 A | * | 3/1999 | Onda et al. | 715/784 |
| 5,923,328 A | * | 7/1999 | Griesmer | 715/854 |
| 5,943,051 A | * | 8/1999 | Onda et al. | 715/786 |
| 5,953,005 A | * | 9/1999 | Liu | 715/243 |
| 5,978,818 A | * | 11/1999 | Lin | 715/209 |

(Continued)

FOREIGN PATENT DOCUMENTS

EP        0971285 A2    1/2000
KR    10-2009-0063449    *    7/2009

OTHER PUBLICATIONS

Patent Cooperation Treaty, "PCT Notification of Transmittal of the International Search Report and the Written Opinion of the International Searching Authority, or the Declaration", Jan. 17, 2011, pp. 1-12, PCT/US2010/048605, European Patent Office, Rijswijk.

(Continued)

*Primary Examiner* — Steven Sax
*Assistant Examiner* — David Choi
(74) *Attorney, Agent, or Firm* — McDermott Will & Emery LLP (57) ABSTRACT

A method and device for enhancing scrolling operations in a display of a device is disclosed. The method includes detecting a scrolling operation on a list of objects in a linear direction. During the scrolling operation, it is determined whether the list of objects is reaching an end and at least one object at the end of the list of objects is extended in the linear direction in response to reaching the end of the list of objects. Further, the method includes determining that the object(s) is reaching a peak length of extension in the linear direction and retracting the object(s) in a reverse linear direction in response to reaching the peak length or in response to detecting that the scrolling operation is terminated.

18 Claims, 4 Drawing Sheets

(56) References Cited

U.S. PATENT DOCUMENTS

| | | | |
|---|---|---|---|
| 6,061,063 A * | 5/2000 | Wagner et al. | 715/784 |
| 6,128,012 A * | 10/2000 | Seidensticker et al. | 345/685 |
| 6,147,670 A * | 11/2000 | Rossmann | 345/685 |
| 6,209,009 B1 * | 3/2001 | Schwartz et al. | 715/201 |
| 6,278,455 B1 * | 8/2001 | Baker | 715/716 |
| 6,288,718 B1 * | 9/2001 | Laursen et al. | 715/800 |
| 6,300,967 B1 * | 10/2001 | Wagner et al. | 715/784 |
| 6,369,837 B1 * | 4/2002 | Schirmer | 715/764 |
| 6,476,831 B1 | 11/2002 | Wirth et al. | |
| 6,486,896 B1 * | 11/2002 | Ubillos | 715/784 |
| 6,532,001 B1 * | 3/2003 | Taraki et al. | 345/163 |
| 6,690,387 B2 * | 2/2004 | Zimmerman et al. | 345/684 |
| 6,952,220 B1 * | 10/2005 | Rossmann | 345/684 |
| 7,184,064 B2 * | 2/2007 | Zimmerman et al. | 345/684 |
| 7,447,987 B2 * | 11/2008 | Sauermann | 715/212 |
| 7,458,035 B2 * | 11/2008 | Lindemann | 715/784 |
| 7,469,381 B2 * | 12/2008 | Ording | 715/702 |
| 7,479,949 B2 | 1/2009 | Jobs et al. | |
| 7,564,467 B2 * | 7/2009 | Haneda et al. | 345/619 |
| 7,786,975 B2 * | 8/2010 | Ording et al. | 345/156 |
| 2005/0114791 A1 | 5/2005 | Bollenbacher et al. | |
| 2006/0143577 A1 * | 6/2006 | Hsieh et al. | 715/815 |
| 2008/0168384 A1 * | 7/2008 | Platzer et al. | 715/784 |
| 2008/0168478 A1 * | 7/2008 | Platzer et al. | 719/328 |
| 2009/0070711 A1 * | 3/2009 | Kwak et al. | 715/829 |
| 2009/0228825 A1 * | 9/2009 | Van Os et al. | 715/780 |
| 2010/0050076 A1 * | 2/2010 | Roth | 715/702 |
| 2010/0162306 A1 * | 6/2010 | Craner | 725/39 |
| 2010/0283743 A1 * | 11/2010 | Coddington | 345/173 |
| 2011/0010659 A1 * | 1/2011 | Kim et al. | 715/784 |
| 2011/0069017 A1 * | 3/2011 | Victor | 345/173 |
| 2011/0090255 A1 * | 4/2011 | Wilson et al. | 345/647 |
| 2011/0107264 A1 * | 5/2011 | Akella | 715/830 |
| 2011/0126156 A1 * | 5/2011 | Krishnaraj et al. | 715/828 |
| 2011/0202834 A1 * | 8/2011 | Mandryk et al. | 715/701 |
| 2011/0202859 A1 * | 8/2011 | Fong | 715/769 |
| 2011/0252362 A1 * | 10/2011 | Cho et al. | 715/784 |
| 2012/0272181 A1 * | 10/2012 | Rogers et al. | 715/784 |

OTHER PUBLICATIONS

"LG Launches ARENA Fully-Loaded Multimedia Flagship Phone for 2009" http://www.prweb.com/releases/2009/02/prweb2083304.htm.

CNET Asia "Samsung Ultra Touch (S8300)".

"Video: iSwish puts the iPhone UI on any Windows Mobile phone" http://www.engadget.com/2008/04/30/video-iswish-puts-the-iphone-ui-on-any-windows-mobile-phone/2.

"iPhone-like Browsing Experience on Windows Mobile with Opera Mobile 9.5" http://www.publicvoid.dk/iPhonelikeBrowsingExperienceOnWindowsMobileWithOperaMobile95.aspx.

U.S. Appl. No. 60/883,801, filed Jan. 7, 2007, in the name of Bas Ording, entitled "List Scrolling and Document Translation on a Touch-Screen Display".

U.S. Appl. No. 60/945,858, filed Jun. 22, 2007, in the name of Bas Ording, entitled "List Scrolling and Document Translation on a Touch-Screen Display".

U.S. Appl. No. 60/946,971, filed Jun. 28, 2007, in the name of Bas Ording, entitled "List Scrolling and Document Translation, Scaling and Rotation on a Touch-Screen Display".

* cited by examiner

METHOD AND DEVICE FOR ENHANCING SCROLLING OPERATIONS IN A DISPLAY DEVICE

FIELD OF THE DISCLOSURE

The present disclosure relates generally to a user interface for displaying content in a display device and more particularly to enhancing the scrolling operation in the user interface of the display device.

BACKGROUND

Display devices have evolved to provide scrolling functionality in order to facilitate the display of a graphic representation of a list or a text document that is too large to be shown on the display area in its entirety. The display area can be scrolled in response to a user input so that a different portion of the list is displayed. The user input can be provided using a scrollbar, arrow keys on a keyboard, scroll wheel, rocker switch, five-way navigation button, or the like. The user may scroll through a list by any increment, including line-by-line, page-by-page, or item by item, etc.

While scrolling a list, the user needs to know that the list is reaching or has reached the beginning or the end of the list. Various visual indicators have been devised in an attempt to provide users with an indication as to the position, or context, of the displayed portion within the document. One common means is a scroll bar having a position indicator. However, such indicators are typically provided in a border of the display screen, where the user may not notice them. Furthermore, a user is typically focused on the content of the list and is not likely to pay attention to a scroll bar position indicator or similar means. Also, such indicators occupy some useful display space which can otherwise be used for displaying the content of the list.

Accordingly, there is a need for a device and a method for enhancing scrolling operations.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Various embodiments of the invention disclose a method and device for enhancing scrolling operations in a display of a device. The method includes detecting a scrolling operation on a list of objects in a linear direction. During the scrolling operation, it is determined whether the list of objects is reaching an end and at least one object at the end of the list of objects is extended in the linear direction in response to reaching the end of the list of objects. Further, the method includes determining that the object or objects have reached a peak length of extension in the linear direction and retracting the object or objects in a reverse linear direction in response to reaching the peak length or in response to detecting that the scrolling operation is terminated.

A display device includes a display for rendering a list of objects and a user interface for receiving a user input to perform a scrolling operation on the list of objects. The display device determines that the list of objects is reaching an end during the scrolling operation and extends at least one object at the end of the list of objects in the linear direction. The display device determines that the object or objects have reached a peak length of extension in the linear direction, and retracts the object or objects in a reverse linear direction in response to reaching the peak length.

Before describing in detail the method for enhancing scrolling operations in a display of a device, it should be observed that the present invention resides primarily in combinations of method steps and device components related to providing enhanced scrolling operations in a display device. Accordingly, the method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

Figure 1:
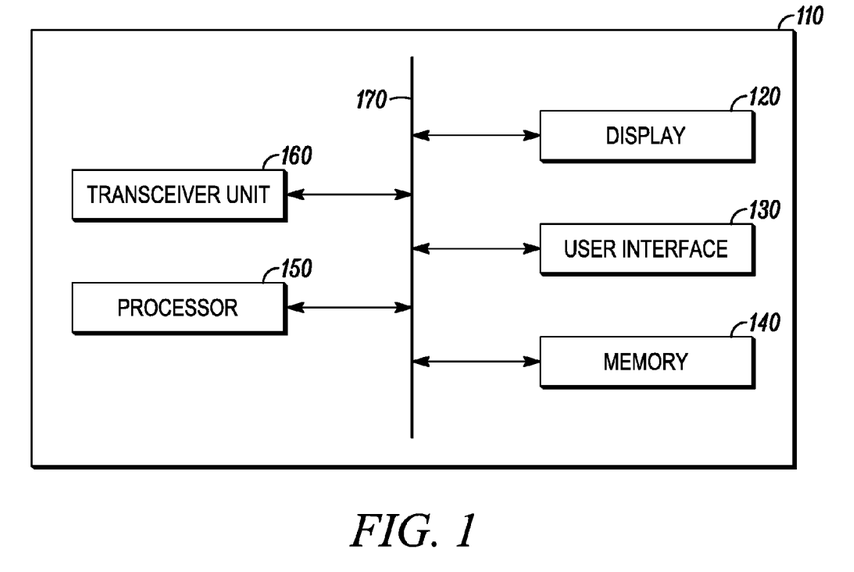
FIG. 1 is a block diagram of a display device in accordance with some embodiments.

FIG. 1 is a block diagram of a display device in accordance with some embodiments. The display device includes a display 120, user interface 130, memory 140, processor 150, and a transceiver unit 160, each capable of communicating with one or more other components of the display device. For example, as shown in FIG. 1, all components are coupled to a bidirectional system bus 170. Examples of the display device 110 include computer screens, kiosks, personal digital assistants (PDAs), handheld computing devices, music players, televisions, cell phones, and the like. One skilled in the art will recognize that the techniques described herein may be extended to any environment where a scrolling display is implemented.

The user interface 130 directs user input data to the processor 150 and represents input devices and output devices for interfacing with a user. The input devices are used for receiving user inputs to the display device and communicating the user inputs to the processor. The input devices may generate key input data from commands entered by a user to control various operations of the display device. The input devices allow the user to enter various types of information, and may include a keypad, a dome switch, a touch pad (e.g., a touch sensitive member that detects changes in resistance, pressure, capacitance, etc. due to contact), a jog wheel, a jog switch, and the like. In particular, when the touch pad is overlaid on the display in a layered manner, it may form a touch screen. The output devices render information to the user, and may include a printer, a speaker, a monitor, and the like.

The processor 150 (such as a microprocessor or the like) typically controls the general operations of the display device. For example, the processor 150 performs controlling and processing associated with computation, communication, transaction, and the like.

The memory 140 may store software programs or the like used for the processing and controlling operations performed by the processor 150, or may temporarily store data (e.g., a phonebook, messages, still images, video, etc.) that have been inputted or which are to be outputted. For example, the memory 140 stores the graphic user interface (GUI) program that contains the commands for presenting information on the display 120. The memory 140 may include at least one type of storage medium including a Flash memory, a hard disk, a multimedia card, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, and the like.

The transceiver unit 160 can be implemented as a transmitting and receiving component of the display device 110. In an embodiment, the functions of the transceiver 160 can be implemented in the processor 150. The transceiver unit 160 makes content available to the display device 110 over an antenna (not shown). The antenna includes any known or developed structure for radiating and receiving electromagnetic energy in the frequency range containing the wireless carrier frequencies.

The display 120 is used for rendering information received and/or processed in the display device 110. For example, when the display device 110 is in a phone call mode, the display may render a User Interface (UI) or a Graphic User Interface (GUI) associated with a call or other communication (such as text messaging, multimedia file downloading, etc.). When the display device 110 is in a video call mode or image capturing mode, the display 120 may display a captured image and/or received image, a UI or GUI that shows videos or images and functions related thereto, and the like.

Figure 2:
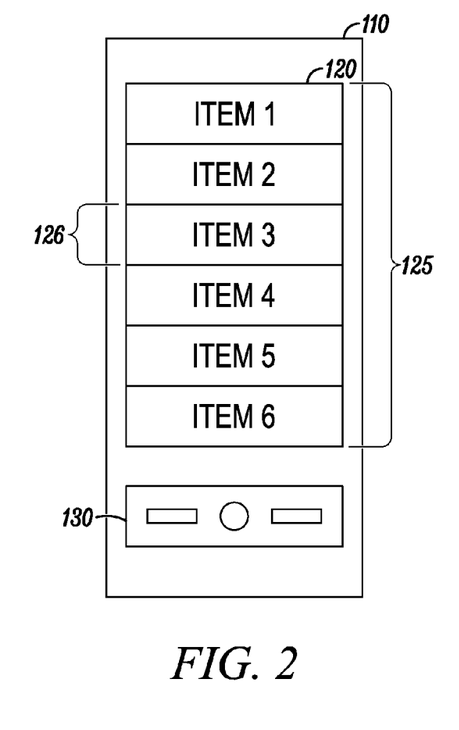
FIG. 2 illustrates a display region on the display device in accordance with some embodiments.

As shown in FIG. 2, the display 120 renders a list 125 of items such as applications, contacts, emails, messages, picture thumb nails, media files, etc., which a user can navigate through and select. The items in the displayed list 125 are each rendered within a field 126 on the display 120, where each field 126 is of a certain height 'h.' For a list of 'n' item, 'n' number of fields 126 will be provided. However, at a given time, only 'm' fields 126 can be displayed on the display region 120, where 'm'<'n.' In one embodiment of the invention, the height of the visible display region 120 is approximately 'm'×'h'. Thus, when there are more fields 126 in the list than can be displayed at one time, the list 125 is made scrollable. Similarly, when the list of items 125 is rendered horizontally within 'n' fields each of width 'w,' the width of the visible display region is approximately 'm'×'w.'

The display area is where the user views several portions of the list as the list is being scrolled. As noted above, the total size of the list 125 is larger than the display area, so the number of items of the list that can be displayed in the display area at a time is related to the dimensions of the field 126. When a particular application is accessed using the user interface 130, the processor 150 reads the contents of the application from memory 140 and creates a scrollable list 125 of the content (items). The list 125 is made scrollable if the size of the list exceeds the size of the display area. The plurality of items in the list is provided in a plurality of fields. The number of fields and the height of each field are determined by the processor 150 based on default settings or user preferred settings. The processor 150 then displays a portion of the list having a plurality of items on the display 120. The user can use keyboard commands, such as arrow keys or page-up and page-down keys, or a scrollbar to change the display position of display area (i.e., to scroll) on a line-by-line or page-by-page basis. Based on detecting the user input for scrolling, the processor 150 moves the displayed items list 125 in a corresponding direction, e.g., horizontal, vertical direction, etc. The distance the list moves each time the user initiates a scroll command is equivalent to the height 'h' or width 'w' of each field.

Scrolling through the list may also be implemented on a fixed-increment basis, such as line-by-line, page-by-page, or the like. Page-by-page scrolling is commonly implemented using "page up" and "page down" keys. In scrolling operations, "page-by-page" typically refers to scrolling by approximately a screen's (display area's) worth of displayed content. Thus, scrolling down by one page causes the last line of the currently displayed portion to move to the top of the display area. For relatively small increments, most of the displayed portion of the document remains on the screen while a new portion is displayed. For example, a single line (or other small amount of the displayed content) may be removed from the top of the display window, while a new line (or other increment of new content) is introduced at the bottom of the display window.

While the displayed list is being scrolled on an incremental basis, say field-by-field, the processor 150 checks whether the last item of the list is displayed on the screen 120. If the user continues to scroll the list after the last item of the list is displayed, the processor 150 provides a visual clue to the user indicating that the list has reached an end. Preferably, the visual clue is provided when a last portion of the list of items is displayed. Also, the processor 150 can provide the visual clue when the end of the list is about to be reached. The purpose of the visual clue is to inform the user that he/she is seeing the top of the list 125 and cannot scroll any further up or that he/she is seeing the bottom of the list 125 and cannot scroll any further down.

In an embodiment, the processor 150 detects a beginning of the list and an end of the list based on the total number of fields and the order of the last field that is visible on the display area. Here the term "order" refers to rank or position of a component relative to others. The maximum number of fields that should be displayed at a time on the display area is determined based on a default setting or a user preferred setting. For example, decreasing the size of the fields can increase the number of fields that can be displayed on the display area at a time. However, decreasing the field size might also require the item in the respective field to reduce in size. The default setting might be chosen based on an optimal size of the items required for viewing each item.

In an example, a list may consists of eight items each comprised in a field. If the height of each field is set at about one centimeter and the height of the display area is about five centimeters, the maximum number of fields that can be vertically displayed (one field below the other field) at a time may be five fields. Conversely, if the maximum number of fields that should be displayed at a time is set at about five, then the height of each field may be calculated as one centimeter based on the height of the display area which may be known to be about five centimeters. Further, each scroll operation increments the list by one field. Thus, two scrolls down the list will move the top two items (i.e., fields) in the list up and out of the display area such that fields in the order of three to seven are currently displayed on the display area. Now, the processor measures the order of the last field in the visible display area as seven and determines that the last field, i.e., the eighth field will be reached on the next scroll. Similarly, when the list is being scrolled all the way to the beginning, the processor measures the order of the first field displayed in the display area. For example, if the order of the first field displayed in the display area is five, the processor determines that there are four more fields to be scrolled for the beginning of the list (i.e, the first field) to be displayed. Once the processor detects that the list has been scrolled all the way to the extremities, and the scrolling operation continues further, a visual clue is provided to the user.

In a preferred embodiment, the visual clue is provided by modifying the dimensions of a portion of the list or the last item of the list if the scrolling operation continues after the end-of-list is reached and bringing back the modified list to its original dimensions once the scrolling operation is terminated. In more detail, modifying the dimensions of the last item in the list includes modifying the dimensions of at least one object at the end of the list of objects. Here object refers to text, icon, graphics, image, picture, thumbnail, etc., used for representing an item or content. In an embodiment, at least one dimension of the last object representing an item is extended in a linear direction to give a visual effect as that of a stretched item.

Figure 3:
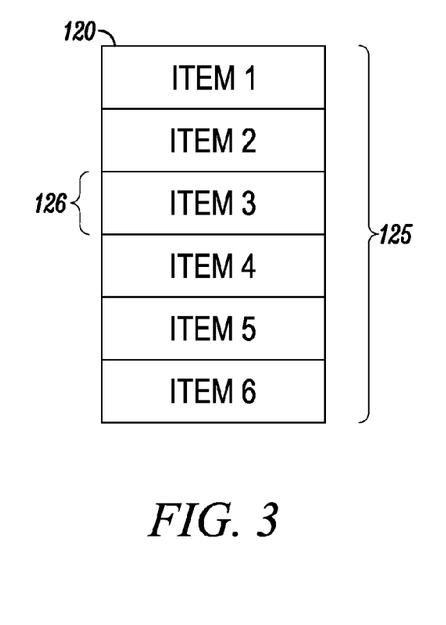
FIG. 3 illustrates an embodiment of the invention implemented in the form of a list that is being scrolled.
Figure 4:
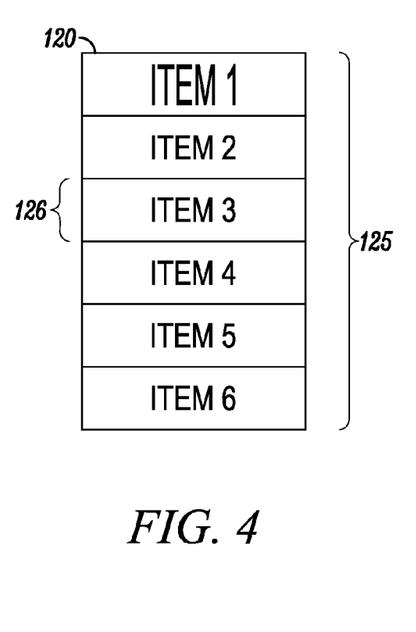
FIG. 4 illustrates an embodiment of the invention implemented in the form of a list that is scrolled all the way to the top.
Figure 5:
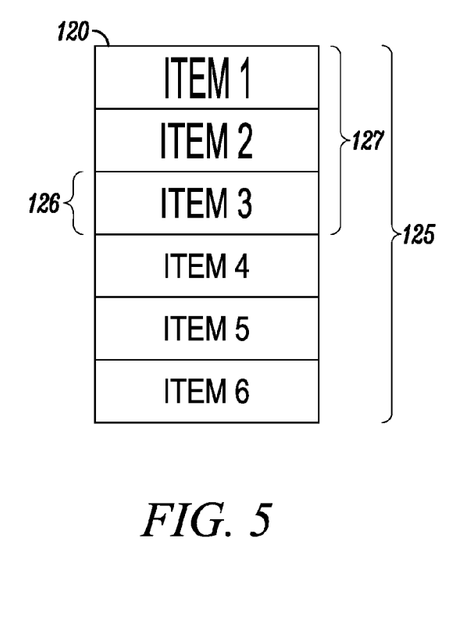
FIG. 5 illustrates another embodiment of the invention implemented in the form of a list that is scrolled all the way to the top.

Referring to FIGS. 3-5, FIG. 3 shows a vertically displayed list of items 125, where each item is represented by a string of characters called 'text.' The list as shown in FIG. 3, represents the list as it would appear during no scrolling or during normal scrolling i.e., before the end or beginning of the list is reached. FIG. 4 illustrates the list as it would appear when the list is scrolled after the beginning of the list is reached. The processor 150 detects that the list has been scrolled all the way to the beginning of the list based on determining that the first field having the first item is displayed on the display area. Upon detecting that the scrolling operation is performed even after the beginning of the list is reached, the processor 150 provides a visual clue to indicate that there are no more items to be scrolled and that the user needn't scroll further. The visual clue is provided as shown, by stretching the text (object) that represents the first item, item 1. Stretching an object refers to increasing at least one dimension of the object such as length, width, and thickness. For example, the length of the string of alphabets representing an item is increased, while maintaining the width of the string of alphabets constant. The object representing the first item is stretched along a direction upto a peak length of extension. The peak length can be a predefined length that defines the maximum linear extent up to which an object representing an item can be stretched in a particular direction. In an embodiment, the peak length is determined based on the intensity of the scrolling operation. The intensity of the scrolling operation is measured in terms of e.g., velocity or acceleration of the scrolling operation such that the peak length in the linear direction is proportional to the intensity of the scrolling operation. Once the object has been stretched to the peak length, the object is made to retract to its original dimensions. In another embodiment, the object can snap back to its original dimensions once the scrolling operation is terminated. In yet another embodiment, the stretched object can snap back to its original dimensions after the object is stretched to the peak length and remains stretched for a predetermined amount of time, say few seconds.

In another embodiment, as shown in FIG. 5, when the processor 150 detects that the beginning of the list is displayed and the scrolling operation continues, then a portion 127 of the list of items can be stretched along a single direction to provide a visual clue to the user. A portion of the list refers to a subset of the items in the list 125. The number of items that define a subset can be predefined and preferably form the first few items at the beginning of the list. For example, when the list is scrolled to the beginning of the list, the first three objects representing the first three items can be stretched to provide the visual clue. At least one dimension of each of the first three objects is extended upto a peak length which is different from the peak length of extension for the other two objects. For example, the objects representing each of the three items are stretched to a decreasing order of peak lengths. In other words, a peak length of extension for the third item is less than a peak length of extension for the second item, whereas a peak length of extension for the second item is less than a peak length of extension for the first item. Stretching the subset of the list of items in such a manner provides a visual effect as that of a stretched elastic sheet. Similarly, when the list 125 is scrolled to the end of the list, the last three objects can be stretched to provide the visual clue. The last three objects are stretched in a direction each upto varying peak lengths.

In another embodiment, instead of stretching an object or a subset of objects, the visual clue is provided by reducing the dimensions of a portion of the list or the last item of the list if the scrolling operation continues after the end-of-list is reached and snapping back to the original dimensions once the scrolling operation is terminated.

Figure 6:
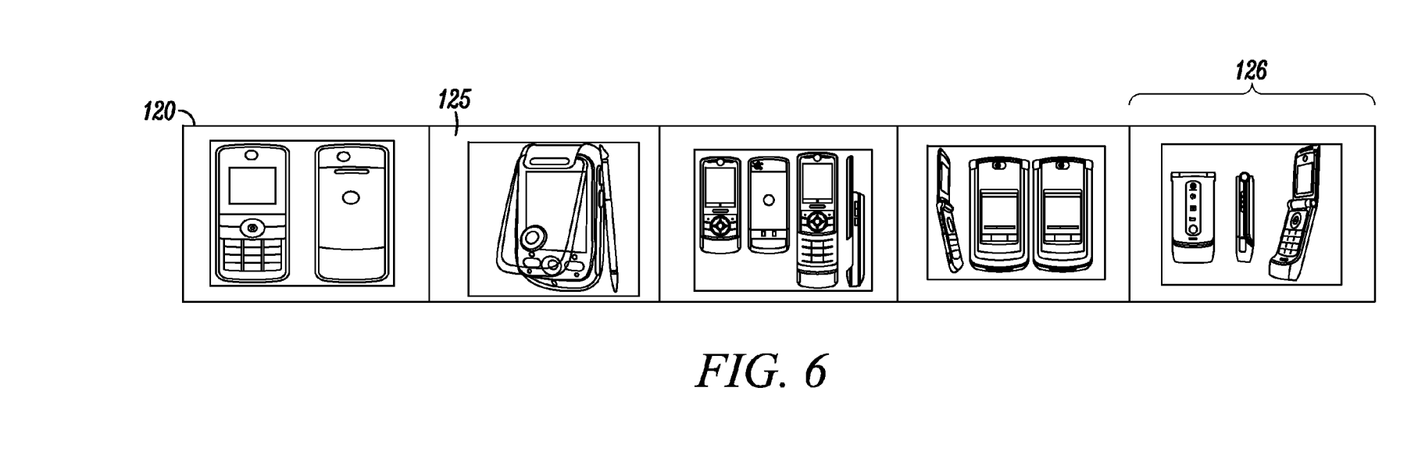
FIG. 6 illustrates an embodiment of the invention implemented in the form of a list that is scrolled all the way to the end.
Figure 7:
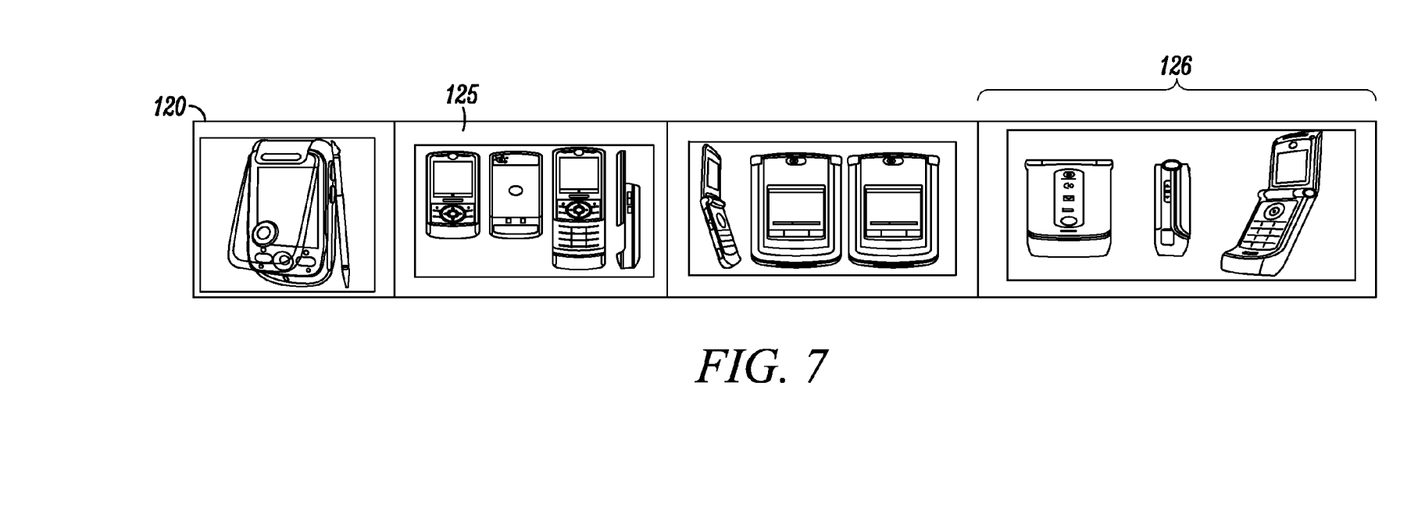
FIG. 7 illustrates an embodiment of the invention implemented in the form of a list that is scrolled all the way to the end.

In an embodiment, while the object representing an item in a field is being stretched, the size of the field is also adjusted in proportion to accommodate the object's new dimensions. Due to the change in the field size of at least one object, the number of fields that can be displayed in the display area is also changed. Referring to FIGS. 6 and 7, FIG. 6 shows an example of a list of thumbnails of images as it would appear during no-scrolling or normal scrolling. When the end of the list is reached and scrolling continues, a subset of the thumbnails at the end of the list is stretched to provide a visual clue. In order to accommodate the new dimensions of the stretched objects, the size of the field 126, in this example, the length of the field 126, is also extended in proportion to the stretched object in each field. However, as discussed earlier, the number of fields that can be displayed on the display area at a time depends on the size of each field and the size of the display area. Since the size of the display area is fixed, a change in the size of the field causes a change in the number of fields that can be displayed at a time. An increase in the dimensions of at least one field causes a decrease in the number of displayable fields. As shown in FIG. 7, stretching a subset of fields at one extreme (right) of the list causes at least one field in the other extreme (left) of the list to be moved out of the display area 120.

Figure 8:
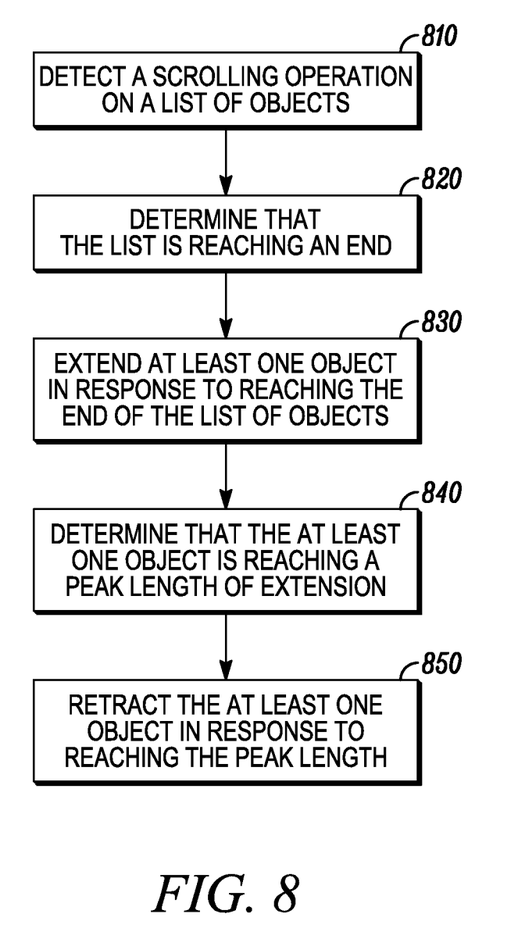
FIG. 8 is a flowchart depicting a method for enhancing scrolling operation in a display device according to one embodiment.

FIG. 8 is a flowchart depicting a method for enhancing scrolling operation in a display device according to one embodiment. As discussed above, the display device detects 810 a scrolling operation on a list of objects. The scrolling operation is detected by receiving a user input via the user interface. As the list is being scrolled, the device determines 820 whether the list of objects is reaching an end. The device determines that the list is reaching an end by determining that at least one object at the end of the list will be displayed during the next scrolling operation. Also, the device determines that the list is reaching an end by determining that at least one object at the end of the list is already displayed on the display area during the scrolling operation.

In response to determining that the list is scrolled to an end, the device extends 830 at least one object at the end of the list of objects in the linear direction. In an embodiment, only one dimension of the at least one object is extended while keeping other dimensions of the at least one object unchanged. The device extends the at least one object up to a peak length in the linear direction. At 840, the device determines whether the at least one object has reached the peak length of extension and retracts 850 the at least one object in a reverse linear direction in response to reaching the peak length. In an embodiment, a predetermined quantity of objects at the end of the list of objects is extended in a linear direction. For example, the predetermined quantity can be one object. In another embodiment, the predetermined quantity of objects to be extended is a subset of objects at the end of the list of objects. An end of the list refers to the extremity of the list in the direction of scrolling e.g., upward, downward, right, and left. When a subset of the list of objects is extended, a peak length of each object of the subset of objects is in an increasing degree to each subsequent object in the subset.

The method further includes measuring a intensity of the scrolling operation and determining the peak length of extension based on the measured intensity. In an embodiment, intensity of the scrolling operation is measured in terms of velocity and acceleration. For example, when the scrolling operation is measured to have a speed of 'x' meters/second, the peak length of extension can be 4 millimeters. When the scrolling operation is measured to have a speed of 'y' meters/second, where 'y' is less than 'x,' the peak length of extension can be two millimeters.

After extending the at least one object to provide a visual effect of a stretched list, the device determines whether the scrolling operation has terminated. The device then retracts the at least one object in the reverse linear direction in response to determining that the scrolling operation has terminated. The at least one object is retracted back to the original length of the at least one object in the reverse linear direction. The at least one object had an original length before it was extended to the peak length. In an embodiment, the device retracts the at least one object to a reduced length which is less than the original length of the at least one object and, eventually, returns or brings back the at least one object to its original length, thereby, producing the visual effect of a stretched and released elastic sheet.

In accordance with embodiments described above, the present invention optimizes all of the constraints presented in the problem statement. The implementation of the present invention provides enhanced scrolling experience to a user by providing visual clues that inform the user weather the display area can be scrolled further or not.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method in a display of a device, the method comprising:
    detecting a scrolling operation on a list of objects in a linear direction;
    measuring intensity of the scrolling operation;
    determining that the list of objects is reaching an end during the scrolling operation;
    extending at least one object at the end of the list of objects in the linear direction by modifying at least one dimension of the at least one object in response to reaching the end of the list of objects;
    determining a peak length in a linear direction based on the intensity of the scrolling operation;
    determining that the at least one object is reaching the peak length of extension in the linear direction; and
    retracting the at least one object in a reverse linear direction by again modifying the at least one dimension of the at least one object in response to reaching the peak length.

2. The method of claim 1, wherein determining that the list of objects is reaching an end comprises determining that the at least one object at the end of the list of objects will be displayed during the scrolling operation.

3. The method of claim 1, wherein determining that the list of objects is reaching an end comprises determining that the at least one object at the end of the list of objects has been displayed during the scrolling operation.

4. The method of claim 1, wherein extending at least one object at the end of the list of objects in the linear direction includes extending a predetermined quantity of objects at the end of the list of objects in a linear direction.

5. The method of claim 4, wherein the predetermined quantity is one object.

6. The method of claim 1, wherein extending at least one object at the end of the list of objects in the linear direction includes extending a predetermined length of objects at the end of the list of objects in a linear direction.

7. The method of claim 1, wherein extending at least one object at the end of the list of objects in the linear direction includes extending one dimension of the at least one object while maintaining other dimensions of the at least one object.

8. The method of claim 1, wherein measuring intensity of the scrolling operation includes measuring velocity or acceleration of the scrolling operation.

9. The method of claim 1, wherein determining the peak length in the linear direction based on the intensity of the scrolling operation includes determining the peak length in the linear direction proportional to the intensity of the scrolling operation.

10. The method of claim 1, wherein extending at least one object at the end of the list of objects in the linear direction comprises increasing the peak length of each object of the at least one object with each subsequent object.

11. The method of claim 1, further comprising:
    determining that the scrolling operation has terminated; and
    retracting the at least one object in the reverse linear direction in response to determining that the scrolling operation has terminated.

12. The method of claim 1, wherein:
    the at least one object had an original length before extending the at least one object at the end of the list of objects in the linear direction; and
    retracting the at least one object in the reverse linear direction includes retracting the at least one object back to the original length of the at least one object.

13. The method of claim 1, wherein:
    the at least one object had an original length before extending the at least one object at the end of the list of objects in the linear direction; and
    retracting the at least one object in the reverse linear direction includes retracting the at least one object to a reduced length less than the original length of the at least one object and, eventually, returning to the original length of the at least one object.

14. A device comprising:
    a display for rendering a list of objects;
    a user interface configured to receive a user input to perform a scrolling operation on the list of objects in a linear direction; and
    a processor configured to determine that the list of objects is reaching an end during the scrolling operation, extend at least one object at the end of the list of objects in the linear direction by modifying at least one dimension of the at least one object in response to reaching the end of the list of objects, measure intensity of the scrolling operation, determine a peak length in a linear direction based on the intensity of the scrolling operation; determine that the at least one object is reaching the peak length of extension in the linear direction, and retracting the at least one object in a reverse linear direction by again modifying the at least one dimension of the at least one object in response to reaching the peak length.

15. The device of claim 14, wherein the user input is received by means of a touch input, a key input, or a cursor movement.

16. The device of claim 14, wherein the list of objects includes text or graphics or both.

17. The device of claim 14, wherein the processor is further configured to determine that the scrolling operation has terminated; and retract the at least one object in the reverse linear direction in response to determining that the scrolling operation has terminated.

18. The device of claim 14, wherein the reverse linear direction is a direction opposite the linear direction.

* * * * *